US008643891B2

(12) United States Patent
Fujita et al.

(10) Patent No.: US 8,643,891 B2
(45) Date of Patent: Feb. 4, 2014

(54) DEVICE, METHOD, SYSTEM, AND COMPUTER PROGRAM PRODUCT FOR CREATING IMAGE DATA TO FORM A MULTI-LAYER IMAGE ON A MEDIUM USING MULTIPLE SETS OF SINGLE-LAYER DATA

(75) Inventors: Toru Fujita, Nagano (JP); Minoru Koyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 13/419,511

(22) Filed: Mar. 14, 2012

(65) Prior Publication Data
US 2012/0236367 A1 Sep. 20, 2012

(30) Foreign Application Priority Data

Mar. 14, 2011 (JP) ................. 2011-055779

(51) Int. Cl.
*G06K 15/02* (2006.01)
*H04N 1/387* (2006.01)
*H04N 1/60* (2006.01)
*B41M 3/00* (2006.01)
B41J 2/21 (2006.01)
B29C 37/00 (2006.01)
G06K 15/10 (2006.01)

(52) U.S. Cl.
CPC .......... *G06K 15/1868* (2013.01); *H04N 1/3872* (2013.01); *H04N 1/6002* (2013.01); *H04N 1/6019* (2013.01); *H04N 1/6097* (2013.01); *B29C 37/00* (2013.01); *G06K 15/102* (2013.01); *G06K 2215/0082* (2013.01); *B41M 3/008* (2013.01); *B41J 2/21* (2013.01)
USPC ............. 358/1.2; 358/1.9; 358/502; 358/518; 358/523; 358/528; 427/264; 427/265; 427/276; 264/132

(58) Field of Classification Search
USPC ......... 358/1.2, 1.9, 3.01, 1.18, 501, 502, 518, 358/520, 521, 530, 540; 382/274, 285, 298; 700/197, 200; 427/256, 264, 265, 275, 427/276; 264/129, 132, 134
See application file for complete search history.

(56) References Cited

U.S. PATENT DOCUMENTS 6,462,836 B1 10/2002 Sato et al.
2009/0009547 A1 1/2009 Udagawa et al.

FOREIGN PATENT DOCUMENTS

| JP | 63-104816 A | 5/1988 |
| JP | 11-317876 A | 11/1999 |
| JP | 2006-051697 A | 2/2006 |

*Primary Examiner* — Scott A Rogers
(74) *Attorney, Agent, or Firm* — Global IP Counselors, LLP

(57) ABSTRACT

An image processing device includes a multi-layer data acquiring part configured to acquire multi-layer data having a required-formation-amount-related value representing a value relating to a formation amount required to form an image, and an expanding part configured to expand, based on a correspondence relationship for expansion, the acquired multi-layer data into multiple sets of single-layer data. The correspondence relationship for expansion has a correspondence relationship between the required-formation-amount-related value in each of the sets of single-layer data and the required-formation-amount-related value in the multi-layer data. The required-formation-amount-related value in the multi-layer data is image data that exceeds a maximum-formation-amount-related value representing a value relating to a maximum formation amount of a color value of the single-layer data with which an image can be printed in a single printing process. The required-formation-amount-related value in the single-layer data is image data that is equal to or less than the maximum-formation-amount-related value.

13 Claims, 9 Drawing Sheets

| Target Color | | | 100% | | | | 150% | | | | 200% | | | | 250% | | | | |
|---|---|---|---|---|---|---|---|---|---|---|---|---|---|---|---|---|---|---|---|
| L | a | b | C | M | Y | K | C | M | Y | K | C | M | Y | K | C | M | Y | K | |
| 40 | 0 | -40 | 70 | 80 | 0 | 0 | 104 | 120 | 0 | 0 | 140 | 161 | 0 | 0 | 176 | 203 | 0 | 0 | ... |
| 40 | 0 | -30 | 60 | 65 | 10 | 0 | 88 | 96 | 14 | 0 | 118 | 130 | 19 | 0 | 150 | 163 | 25 | 0 | ... |
| 40 | 0 | -20 | 48 | 55 | 24 | 0 | 73 | 84 | 37 | 0 | 98 | 112 | 49 | 0 | 123 | 141 | 61 | 0 | ... |
| 40 | 0 | -10 | 33 | 33 | 19 | 9 | 49 | 51 | 29 | 13 | 66 | 67 | 38 | 18 | 83 | 85 | 48 | 22 | ... |
| 40 | 0 | 0 | 15 | 12 | 12 | 30 | 22 | 18 | 18 | 45 | 29 | 24 | 24 | 60 | 37 | 30 | 30 | 75 | ... |
| 40 | 0 | 10 | 0 | 12 | 20 | 15 | 0 | 17 | 30 | 23 | 0 | 23 | 40 | 30 | 0 | 30 | 50 | 38 | ... |
| ... | ... | ... | ... | ... | ... | ... | ... | ... | ... | ... | ... | ... | ... | ... | ... | ... | ... | ... | ... |

AREA VARIATION RATIO Δs

| Element No. | Area Variation Ratio ΔS |
|---|---|
| 1 | 114% |
| 2 | 128% |
| 3 | 142% |
| 4 | 154% |
| 5 | 166% |
| 6 | 176% |
| 7 | 184% |
| 8 | 191% |
| 9 | 196% |
| 10 | 199% |
| 11 | 200% |
| 12 | 199% |
| 13 | 196% |
| 14 | 191% |
| ⋮ | |

CMYK VALUE = (102, 98, 125, 2)

72a

| C | M | Y | K | c | m | y | k |
|---|---|---|---|---|---|---|---|
| ⋮ | ⋮ | ⋮ | ⋮ | ⋮ | ⋮ | ⋮ | ⋮ |
| 100 | 90 | 130 | 0 → | 91 | 94 | 100 | 0 |
| ⋮ | ⋮ | ⋮ | ⋮ | ⋮ | ⋮ | ⋮ | ⋮ |

|  | INPUT CMYK | | | | OUTPUT cymk | | | |
|---|---|---|---|---|---|---|---|---|
|  | C | M | Y | K | c | m | y | k |
| P1 | 100 | 90 | 120 | 0 | 93 | 92 | 100 | 0 |
| P2 | 100 | 90 | 120 | 10 | 91 | 93 | 100 | 2 |
| P3 | 100 | 90 | 130 | 0 | 91 | 94 | 100 | 0 |
| P4 | 100 | 90 | 130 | 10 | 92 | 92 | 100 | 3 |
| P5 | 100 | 100 | 120 | 0 | 94 | 95 | 100 | 0 |
| P6 | 100 | 100 | 120 | 10 | 92 | 96 | 100 | 3 |
| P7 | 100 | 100 | 130 | 0 | 93 | 97 | 100 | 0 |
| P8 | 100 | 100 | 130 | 10 | 91 | 94 | 100 | 2 |
| P9 | 110 | 90 | 120 | 0 | 98 | 93 | 100 | 0 |
| P10 | 110 | 90 | 120 | 10 | 97 | 92 | 100 | 1 |
| P11 | 110 | 90 | 130 | 0 | 98 | 92 | 100 | 0 |
| P12 | 110 | 90 | 130 | 10 | 99 | 94 | 100 | 2 |
| P13 | 110 | 100 | 120 | 0 | 97 | 96 | 100 | 0 |
| P14 | 110 | 100 | 120 | 10 | 98 | 95 | 100 | 1 |
| P15 | 110 | 100 | 130 | 0 | 96 | 94 | 100 | 0 |
| P16 | 110 | 100 | 130 | 10 | 99 | 97 | 100 | 3 |

INTERPOLATION PROCESSING cymk VALUE = (92, 94, 100, 1)

DEVICE, METHOD, SYSTEM, AND COMPUTER PROGRAM PRODUCT FOR CREATING IMAGE DATA TO FORM A MULTI-LAYER IMAGE ON A MEDIUM USING MULTIPLE SETS OF SINGLE-LAYER DATA

CROSS-REFERENCE TO RELATED APPLICATIONS

This application claims priority to Japanese Patent Application No. 2011-055779 filed on Mar. 14, 2011. The entire disclosure of Japanese Patent Application No. 2011-055779 is hereby incorporated herein by reference.

BACKGROUND

1. Technical Field

The present invention relates to an image processing device, an image processing system, and an image processing method.

2. Related Art

Conventionally, there has been proposed a technique in which, when a picture is printed in advance onto a molding film, printing is applied in a denser manner to a portion that is stretched than to a portion that is not stretched during molding (e.g., see Japanese Laid-Open Patent Application Publication No. 63-104816). In this technique, when printing is performed using printing ink and a picture is formed on a molding film, in an instance in which the printing method is a screen printing method, a portion to be made denser is printed repeatedly; and in an instance in which the printing method is a gravure printing method, a required portion is etched to a deeper extent during plate making, whereby the portion that is stretched is made denser than the portion that is not stretched, and a decrease in picture density during molding is minimized.

SUMMARY

Recently, pictures to be printed onto such molding films have been envisaged for use in printing as digital data (image data). A problem is presented in regard to how, in such an instance, digital data including a portion to be made denser (i.e., a portion to be printed repeatedly) is to be converted into data for printing.

One object of an image processing device, an image processing system, and an image processing method according to the present invention is to make it possible to form, on a medium, an image represented by image data for which an image must be formed a plurality of times.

In order to achieve the object described above, the following means are used in the image processing device, image processing system, and image processing method according to the present invention.

An image processing device according to one aspect of the present invention is a device for creating image data used to form an image on a medium. The image processing device includes a multi-layer data acquiring part, an expanding part and a storing part. The multi-layer data acquiring part is configured to acquire multi-layer data having a required-formation-amount-related value representing a value relating to a formation amount required to form an image in at least one unit region. The expanding part is configured to expand, based on a correspondence relationship for expansion, the acquired multi-layer data into a plurality of sets of single-layer data. The storing part is configured to store the correspondence relationship for expansion. The correspondence relationship for expansion has a correspondence relationship between the required-formation-amount-related value in each of the sets of single-layer data and the required-formation-amount-related value in the multi-layer data. The required-formation-amount-related value in the multi-layer data is image data that exceeds a maximum-formation-amount-related value representing a value relating to a maximum formation amount used in a single instance of image formation. The required-formation-amount-related value in the single-layer data is image data that is equal to or less than the maximum-formation-amount-related value.

In the image processing device according to the above aspect of the present invention, a correspondence relationship for expansion is stored, multi-layer data is acquired, and the multi-layer data is expanded into a plurality of sets of single-layer data based on the acquired multi-layer data and the stored correspondence relationship for expansion; the correspondence relationship for expansion being a correspondence relationship between a required-formation-amount-related value, which represents a value relating to a formation amount required to form an image in at least one unit region, in multi-layer data, which is image data in which the required-formation-amount-related value exceeds a maximum-formation-amount-related value representing a value relating to a maximum formation amount used in a single instance of image formation; and the required-formation-amount-related value in each of the plurality of sets of single-layer data, the plurality of sets of single-layer data being a plurality of sets of image data in which the required-formation-amount-related value is equal to or less than the maximum-formation-amount-related value in all unit regions. Accordingly, the correspondence relationship for expansion is used to expand the multi-layer data into a plurality of sets of single-layer data. Therefore, image formation on the medium is performed a plurality of times so that images corresponding to each of the sets of single-layer data overlap each other, thereby making it possible to foam the image represented by the multi-layer data on the medium. The "required-formation-amount-related value" and the "maximum-formation-amount-related value" may refer to the amount of a forming agent (e.g., an amount where 100 represents the amount of the forming agent corresponding to the maximum-formation-amount-related value) or the pixel value (e.g., a value where 100 represents the pixel value corresponding to the maximum-formation-amount-related value) used to form an image. The "unit region" may refer to a pixel. The "forming agent" refers to ink or another coloring agent, or to transparent ink or another transparent agent. A transparent agent is used to, e.g., control the shine, hardness, or another surface characteristic of the medium.

In the image processing device according to the aspect described above, the correspondence relationship for expansion is preferably a correspondence relationship between a pixel value in the multi-layer data and an amount of a forming agent having a generic color or a color used to form an image in relation to each of the sets of single-layer data. Specifically, the required-formation-amount-related value in the multi-layer data may represent a pixel value, and the required-formation-amount-related value in the single-layer data may represent the amount of forming agent having a generic color or a color used to form an image. Thus, a pixel value in the multi-layer data can be converted to an amount of forming agent in each of the sets of single-layer data using the correspondence relationship for expansion, therefore making it possible to reduce the number of processes compared to an instance in which expansion of the multi-layer data into the plurality of sets of single-layer data and conversion of the pixel value to the amount of forming agent are performed separately.

In the image processing device according to the aspect described above, the multi-layer data acquiring part is preferably configured to acquire the multi-layer data in which an image is expressed using a color combination according to a generic color system. Thus, it is possible to cause the required-formation-amount-related value of the multi-layer data to resemble that of normal image data (data corresponding to single-layer data) except that the required-formation-amount-related value exceeds the maximum-formation-amount-related value in at least one unit region. Therefore, the multi-layer data can be made more versatile. Here, a "generic color system" refers to any of the CMYK color system, the RGB color system, or the L*a*b* color system.

In the image processing device according to the aspect described above, the image processing device is preferably configured to create the image data for a molded article formed by forming an image on the medium based on the image data and then causing the medium to deform. In such an instance, the image processing device may include a color-correspondence-relationship-storing part configured to store a color correspondence relationship, which is a correspondence relationship between a degree of deformation of the medium, a color before deformation, and a color after deformation reflecting a color change accompanying deformation, a deformation-degree-acquiring part configured to acquire the degree of deformation in each portion of the medium, and a color-determining part configured to determine a color of an image to be formed on each portion of the medium in relation to a color of an image of the molded article based on the acquired degree of deformation and the stored color correspondence relationship. The multi-layer data is preferably data in which the color of the image to be formed on each portion of the medium has been determined by the color-determining part.

An image processing system according to another aspect includes the image processing device according the aspects described above, and an image-forming device configured to form an image on the medium using a forming agent for forming an image, the image-forming device including an image-forming part configured to form images so that images represented by each of the sets of single-layer data overlap in a predetermined sequence, a number of times the images being formed corresponding to a number of sets of single-layer data.

Since the image processing system according to the above described aspect of the present invention comprises the image processing device according to any of the above-mentioned aspects of the present invention, it is possible to obtain an effect similar to one obtained using the image processing device according to the present invention, e.g., an effect in which an image represented by multi-layer data can be formed on a medium by forming an image a plurality of number of times using a plurality of sets of single-layer data.

An image processing method according to another aspect of the present invention is a method for creating image data used to form an image on a medium. The image processing method includes: acquiring multi-layer data, which is image data in which a required-formation-amount-related value representing a value relating to a formation amount required to form an image in at least one unit region exceeds a maximum-formation-amount-related value representing a value relating to a maximum formation amount used in a single instance of image formation; and expanding, into a plurality of sets of single-layer data, the acquired multi-layer data based on the acquired multi-layer data and a correspondence relationship for expansion. The correspondence relationship for expansion is preferably a correspondence relationship between the required-formation-amount-related value in the multi-layer data and the required-formation-amount-related value in each of the sets of single-layer data. The required-formation-amount-related value of each of the plurality of sets of single-layer data is equal to or less than the maximum-formation-amount-related value.

In the image processing method according to the above described aspect of the present invention, a correspondence relationship for expansion is stored, multi-layer data is acquired, and the multi-layer data is expanded into a plurality of sets of single-layer data based on the acquired multi-layer data and the stored correspondence relationship for expansion; the correspondence relationship for expansion being a correspondence relationship between a required-formation-amount-related value, which represents a value relating to a formation amount required to form an image in at least one unit region, in multi-layer data, which is image data in which the required-formation-amount-related value exceeds a maximum-formation-amount-related value representing a value relating to a maximum formation amount used in a single instance of image formation; and the required-formation-amount-related value in each of the plurality of sets of single-layer data, the plurality of sets of single-layer data being a plurality of sets of image data in which the required-formation-amount-related value is equal to or less than the maximum-formation-amount-related value in all unit regions. Accordingly, the correspondence relationship for expansion is used to expand the multi-layer data into a plurality of sets of single-layer data. Therefore, image formation on the medium is performed a plurality of times so that images corresponding to each of the sets of single-layer data overlap each other, thereby making it possible to form the image represented by the multi-layer data on the medium. The "required-formation-amount-related value" and the "maximum-formation-amount-related value" may refer to the amount of a forming agent (e.g., an amount where 100 represents the amount of the forming agent corresponding to the maximum-formation-amount-related value) or the pixel value (e.g., a value where 100 represents the pixel value corresponding to the maximum-formation-amount-related value) used to form an image. The "unit region" may refer to a pixel.

BRIEF DESCRIPTION OF THE DRAWINGS

Referring now to the attached drawings which form a part of this original disclosure:

FIG. 2 is a diagram illustrating an example of a color compensation conversion LUT 64;

DETAILED DESCRIPTION OF EXEMPLARY EMBODIMENTS

Figure 1:
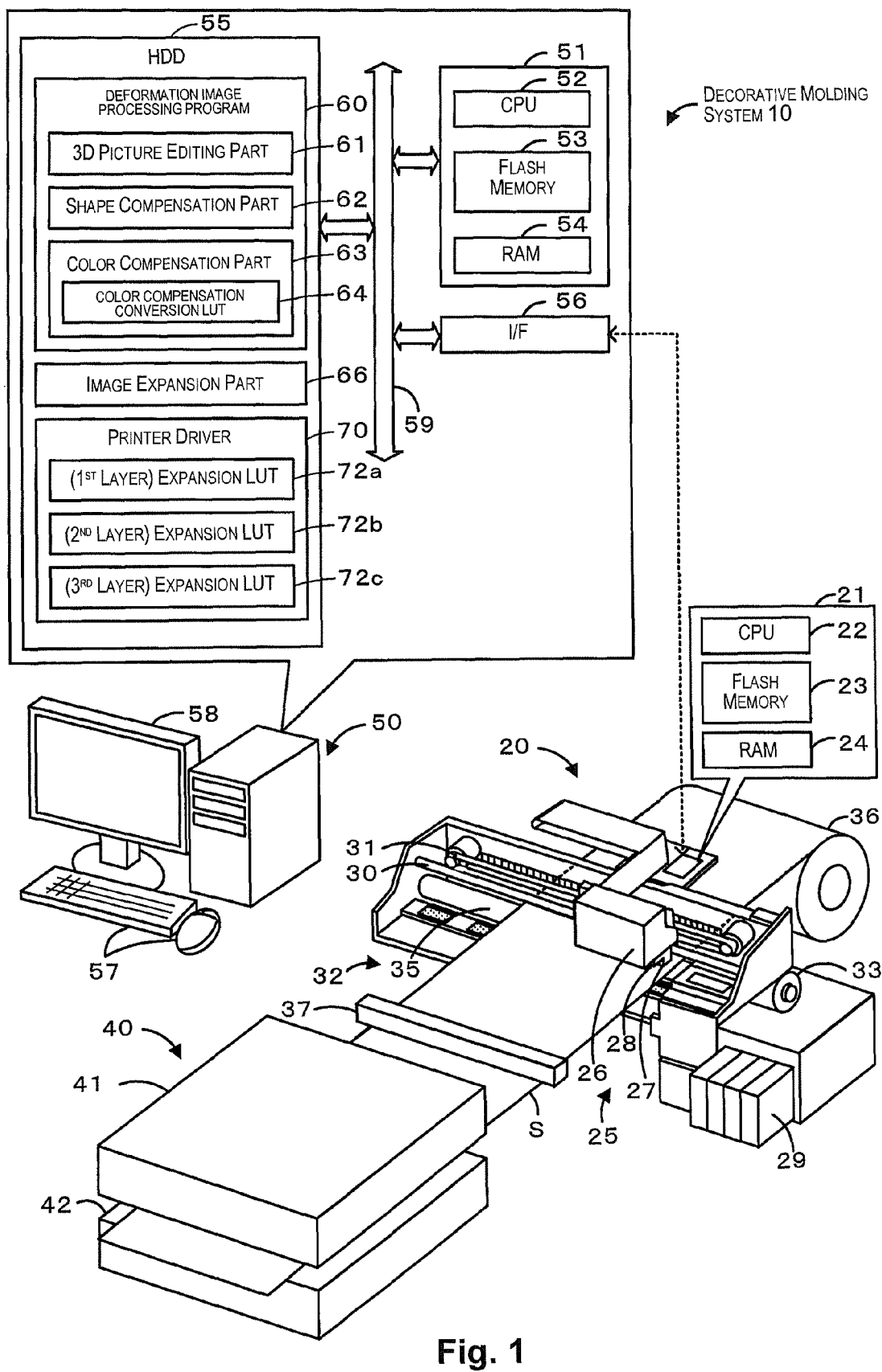
FIG. 1 is a configuration diagram showing an overview of a configuration of a decorative molding system 10.

Next, an embodiment of the present invention will be described with reference to the accompanying drawings. FIG. 1 is a configuration diagram showing an overview of a configuration of a decorative molding system 10, which is an embodiment of the present invention. As shown in the drawing, the decorative molding system 10 according to the present embodiment comprises a printer 20, a molding device 40, and a generic personal computer (PC) 50. The printer 20 draws out a resin sheet (e.g. a polyethylene film) or another medium S from a roll 36, in which the medium S is wound in a roll shape; ejects ink, which functions as a forming agent for image formation; and thereby forms (prints) an image. The molding device 40 performs solid-shape molding, to a desired three-dimensional shape, of the medium S on which an image has been formed (printed). The PC 50 has a function of an image processing device communicably connected to the printer 20; an image to be formed on the medium S is inputted into, and is processed into print data and outputted by, the image processing device. The PC 50 and the printer 20 correspond to the image processing system of the present invention.

The printer 20 comprises a controller 21 for controlling the entire device; a printing mechanism 25 for ejecting ink onto the medium S; and a transport mechanism 32 for transporting the medium S while drawing the medium S from the roll 36. The controller 21 is configured as a microprocessor centered around a CPU 22, and comprises a flash memory device 23, on which data can be rewritten, for storing a variety of processing programs; a RAM 24 for storing data temporarily or saving data; and other elements. The controller 21 receives print data from the PC 50 and controls the printing mechanism 25 and the transport mechanism 32 so as to execute a printing process. The printing mechanism 25 comprises a carriage 26, which is moved left/right (along the horizontal scan direction) along a carriage shaft 30 by a carriage belt 31; a printing head 28 for pressurizing ink and ejecting ink droplets from a nozzle 27; and a cartridge 29 for accommodating ink having different colors. The printing head 28 is provided to a lower part of the carriage 26. Using a method in which a voltage is applied to a piezoelectric element, thereby causing the piezoelectric element to deform and applying pressure on ink, the printing head 28 ejects ink having different colors from the nozzle 27 formed on a lower surface of the printing head 28 and forms dots on the medium S. The mechanism for applying pressure on the ink may be one in which heat is applied from a heater to generate bubbles. The cartridge 29, which is mounted on the main-body side, individually accommodates ink having each of cyan (c), magenta (m), yellow (y), and black (k) ("cmyk") colors, and feeds the accommodated ink to the printing head 28 through a tube (not shown). The transport mechanism 32 comprises a transport roller 35, which is driven by a drive motor 33 and which transports the medium S; and other elements.

The molding device 40 comprises an upper mold part 41 arranged upward relative to the medium S, and a lower mold part 42 arranged downward relative to the medium S. A mold (not shown) is positioned in each of the upper mold part 41 and the lower mold part 42. The upper and lower molds clamp together around the medium S and thereby mold the medium S into a three-dimensional shape. Molding performed by the molding device 40 may be heat molding or compression molding. The molds positioned in the molding device 40 are exchangeable so as to allow a plurality of different types of molds to be used. The medium S is cut, before or after molding, into a predetermined length by a cutter 37 arranged between the printer 20 and the molding device 40.

The PC 50 comprises a controller 51 for controlling the entire device; a HDD 55, which is a high-capacity memory device functioning as a storing part for storing a variety of application programs and a variety of data files; a network interface (I/F) 56 for inputting and outputting data with respect to the printer 20 or another external instrument; a keyboard, a mouse, or another input device 57, using which the user inputs a variety of commands; and a display 58 for displaying a variety of information. The controller 51 comprises a CPU 52 for executing a variety of controls; a flash memory device 53 for storing a variety of control programs; an RAM 54 for temporarily storing data; and other elements. The PC 50 has a function of executing an action corresponding to an input operation when the user performs, through the input device 57, the input operation on, e.g., a cursor displayed on the display 58. The controller 51, the HDD 55, the I/F 56, the input device 57, the display 58, and similar elements are electrically connected by a bus 59, and configured so that a variety of control signals and data can be exchanged.

An application program (not shown), a deformation image processing program 60, a printer driver 70, and the like are recorded in the HDD 55 of the PC 50. The deformation image processing program 60 is a program used to correct shape distortion and color distortion, which are generated, by deformation accompanying molding of the medium S, in an image (including characters, pattern, and the like) formed on a surface of a molded article (the medium S after molding). The deformation image processing program 60 has a 3D picture-editing part 61 for editing a three-dimensional image (picture) model; a shape compensation part 62 for compensating shape distortion accompanying molding; and a color compensation part 63 for compensating color distortion accompanying molding.

The 3D picture-editing part 61 has a function of editing an image formed on the medium S before molding, and of editing an image formed on the medium S after molding. The shape compensation part 62 has a function of executing shape compensation, in which any change in the shape of a design (characters or pattern) on the surface of the molded article, generated by deformation in the outer profile of the medium S during molding, is corrected to an intended shape.

The color compensation part 63 has a function of executing color compensation, in which a correction is made to an intended shade using a color compensation conversion look-up table (LUT) 64 in order to reflect any change in the shade of the image generated by deformation of the medium S during molding. The color compensation conversion LUT 64 is a correspondence relationship table empirically defining a relationship between a color value (e.g., pixel value) of a target color required on the molded article after the medium S is deformed, a deformation ratio (area variation ratio (%)) of the medium S, and a color value (e.g., pixel value) of a color to be formed on the medium S before the medium S is deformed. FIG. 2 shows an example of the color compensation conversion LUT 64. In FIG. 2, only a part of the color compensation conversion LUT 64 is shown. Also, in FIG. 2, a value corresponding to the L*, a*, b* color system representing lightness, hue, and chroma (hereafter referred to as "Lab value") is used for the color value of the target color, and a value corresponding to the CMYK color system, which is a generic color system (which may be referred to as "generic colors" hereafter, and represented in uppercase to distinguish from ink colors cmyk of the printer 20), is used for the color value of the color to be formed on the medium S. The CMYK values, which are the color values representing the generic colors CMYK (e.g., pixel values), are assigned within a range of 0 through 300%, where 100% represents a maximum color value, which is a maximum value of a color value of normal image data (hereafter referred to as "single-layer data") using which an image can be printed on the medium S in a single printing process. As shown in FIG. 2, in the color compensation conversion LUT 64, when the color value (target color) and the area variation ratio (%) of the medium S are designated, a CMYK value, representing a color value of the respective color that results in a color value of the designated target color when the medium S has been deformed so as to correspond to the designated area variation ratio (%), is obtained. The color compensation conversion LUT 64 is set up so that, in relation to the color value of the same target color, the CMYK value representing the color value of the color to be formed on the medium S before deformation is greater with increasing area variation ratio (%) after deformation. The color compensation conversion LUT 64 is configured as a table in which each of the Lab values is varied in predetermined increments (e.g., 10), and is to be used by performing a known interpolation process in relation to data between each of the recorded values.

The printer driver 70 is a program for converting a print job received from the application program into print data, which can be used directly by the printer 20 to perform a printing process; and outputting (transmitting) the print data to the printer 20. The printer driver 70 has a function of creating print data based on image data (artwork data) created by the deformation image processing program 60 and three expansion look-up tables (LUT) 72a through 72c used for image data expansion; and outputting the print data to the printer 20. The use of three expansion LUTs 72 is based on the CMYK values representing the CMYK color values being assigned within a range of 0 to 300%. Therefore, the number of the expansion LUTs 72 may be a number corresponding to the range of CMYK values representing the color values. In the description below, the three expansion LUTs 72 may be referred to as first-through third-layer expansion LUTs 72a through 72c. The three first- through third-layer expansion LUTs 72a through 72c, and a process in which the expansion LUTs 72 are used, will be described in detail further below.

Figure 3:
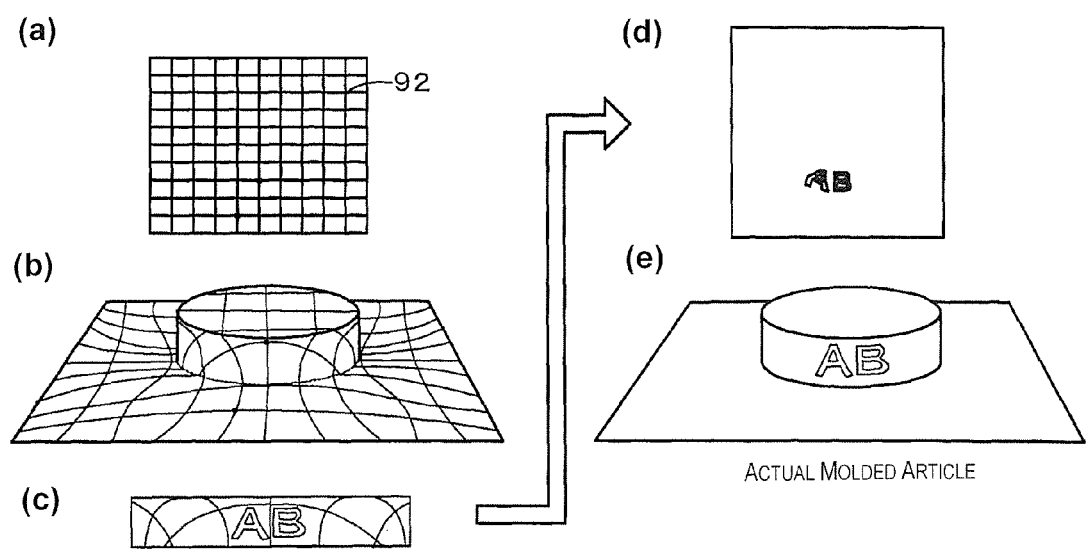
FIG. 3 is a diagram illustrating the scheme of a shape compensation process.

Processes performed by the decorative molding system 10 according to the present embodiment thus configured, and particularly processes performed by the deformation image processing program 60, will now be described in the sequence of a shape compensation process and a color compensation process. FIG. 3 is a diagram illustrating an example of the scheme of the shape compensation process executed by the deformation image processing program 60. In the shape compensation process, the CPU 52 of the controller 51 first creates an image in which a grid 92 having quadrangle (square) elements and having a plurality of grid points that are equally spaced in the vertical and horizontal directions is configured on a flat medium (FIG. 3(*a*)). In order to facilitate illustration, the grid 92 is shown in a state of having fewer grid points (i.e., a state in which the grid points have been omitted) than in reality, and the spacing between the grid points is taken to be larger than the spacing at which the printer 20 forms dots (e.g., 720 dpi or 1440 dpi). Position information representing the initial position (position before deformation) of each of the grid points is maintained. Next, a process is performed so as to cause the medium to deform in order for the product to be molded into the intended product shape; position information for each of the grid points of the grid 92 before and after deformation is inputted, and the three-dimensional coordinate position of each of the grid points after deformation and the direction and amount of deflection of each of the grid points are calculated. A three-dimensional image model of a solid-shape after molding is then created based on the results of the calculation, and a process is performed so as to display the three-dimensional image model that has been created on the display 58 (FIG. 3(*b*)). Next, when the user performs an input operation to designate the position of the picture on the three-dimensional image model, the image to be printed, representing the picture, is arranged in the designated position (FIG. 3(*c*)). When a two-dimensional conversion command is inputted, the coordinate values in three dimensions are converted into coordinate values in two dimensions, and an image after conversion is displayed (FIG. 3(*d*)). Thus, an image shaped so as to result in the intended picture after molding is formed on the medium before molding, and it is possible to create shape compensation data to be printed on the medium S before molding. FIG. 3(*e*) shows an actual molded article resulting from the image represented by the shape compensation data shown in FIG. 3(*d*) being printed on the medium S and molding being performed.

Figure 4:
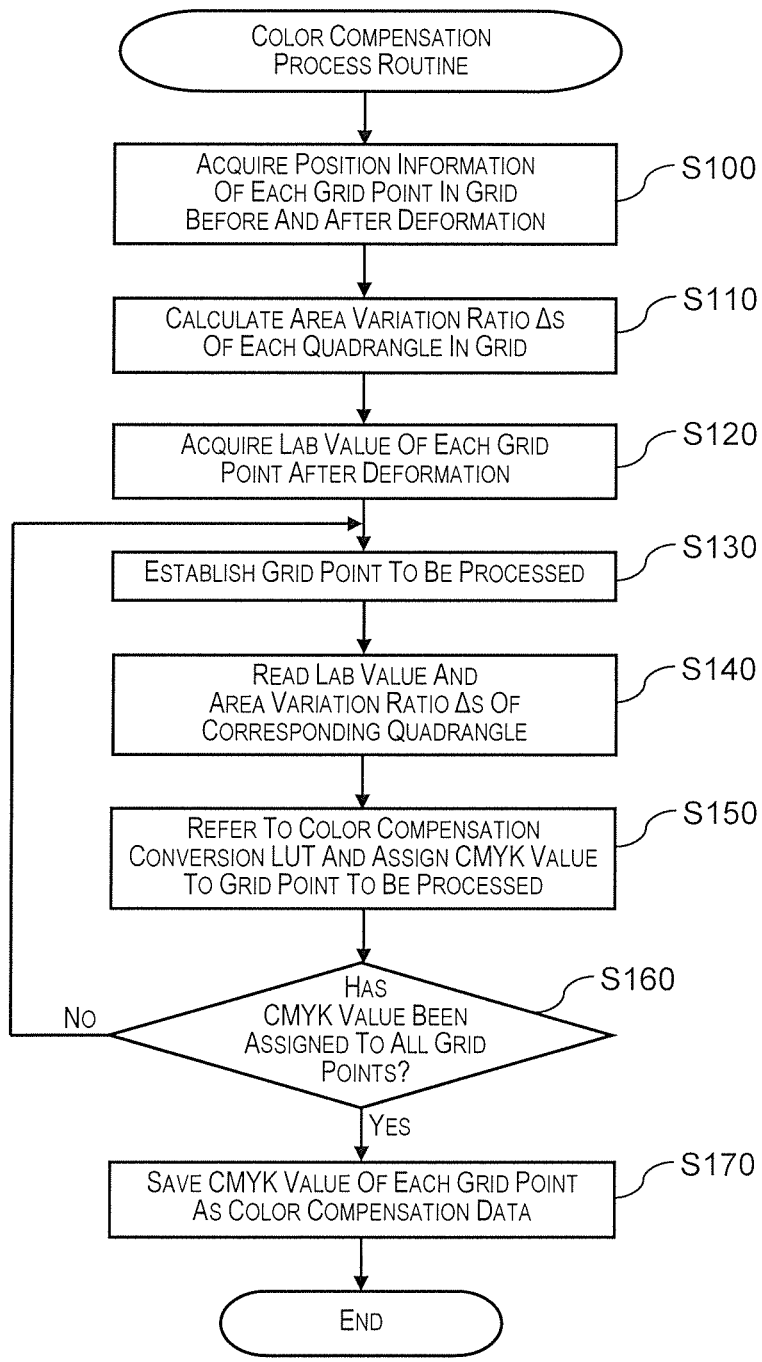
FIG. 4 is a flow chart showing an example of a color compensation routine.

Next, a description will be given for a color compensation process in which the color compensation conversion LUT 64 is used. FIG. 4 is a flow chart showing an example of a color compensation routine executed by the CPU 52 of the controller 51. This routine is stored in the HDD 55 and executed when an "EXECUTE COLOR COMPENSATION" command is inputted after the shape compensation process has been performed. The "EXECUTE COLOR COMPENSATION" command may be inputted by, e.g., clicking, using the input device 57, an "EXECUTE COLOR COMPENSATION" button on an edit screen (not shown) of the deformation image processing program 60 in a state in which the edit screen is displayed on the display 58 after the shape compensation process.

Figures 5, 6:
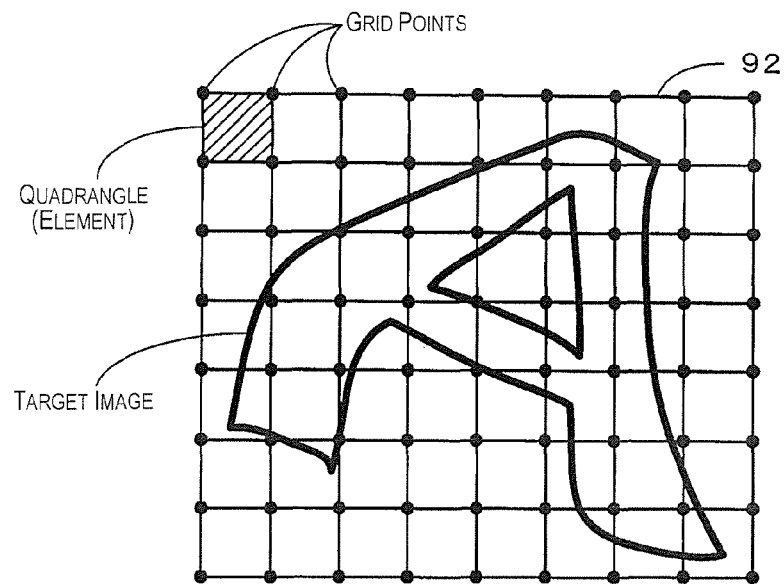
FIG. 5 is a diagram illustrating lattice points and quadrangles of a grid 92.
FIG. 6 is a diagram illustrating an example of the calculated area variation ratio Δs of the quadrangles.

When the color compensation process routine is executed, the CPU 52 first acquires position information for each of the grid points of the grid 92 before and after the deformation treatment (step S100). The position information is acquired by acquiring each of the three-dimensional coordinates of the grid points before and after deformation as described above for the shape compensation process. Next, an area variation ratio Δs of each quadrangle representing each element of the grid 92 is calculated from the acquired position information for each of the grid points (step S110). The grid points and the rectangles of the grid 92 are shown in FIG. 5. FIG. 5 shows an expansion of a part of the grid 92. The target image (letter "A") in FIG. 5 is the image after the above-mentioned shape compensation process (see FIG. 3(*d*)), arranged on the grid 92. The area variation ratio Δs of each of the quadrangles is calculated by calculating the area of each quadrangle before and after deformation from the position information for the grid points before and after deformation acquired in step S100, and dividing the area of the quadrangle after deformation with the area before deformation. Since the pre-deformation area of every quadrangle is identical, a constant value may be used. An example of the area variation ratio Δs of each of the quadrangles thus calculated is shown in FIG. 6. The element numbers are assigned in sequence from left to right and from above to below, starting from the quadrangle at the top left of the grid 92. Next, the Lab value of each of the grid points of the grid 92 is acquired (step S120). The Lab value can be acquired by determining, based on the RGB values, CMYK values, or other color information of the inputted image, the color value of the image after the shape compensation process at positions corresponding to each of the grid points, and converting the determined color value into a Lab value. Alternatively, the Lab value can be acquired by displaying an edit screen (not shown) including the image after the shape compensation process such as that shown in FIG. 3(d) and FIG. 5, allowing the color of the image to be designated using the input device 57, determining the color value at positions corresponding to each of the grid points based on the designated color, and converting the determined color value into a Lab value.

When the Lab value of each of the grid points of the grid 92 and the area variation ratio Δs of each of the quadrangles have been thus acquired, a grid point to be processed is established (step S130), and the Lab value of the grid point to be processed and the area variation ratio Δs of a quadrangle corresponding to the grid point to be processed are read (step S140). The grid point to be processed is established in sequence from left to right and from above to below, starting from the grid point at the top left corner of the grid 92. The quadrangle corresponding to the grid point to be processed may, e.g., be defined to be a quadrangle whose top left vertex is the grid point to be processed; and, in an instance such as a grid point positioned on the right edge or the lower edge of the grid 92 where there is no quadrangle whose top left vertex is the grid point to be processed, defined to be a quadrangle whose top right vertex is the grid point to be processed, or a quadrangle whose bottom left vertex or the bottom right vertex is the grid point to be processed.

Next, a CMYK value, which represents the color value before deformation and which is obtained from the color compensation conversion LUT 64 using the area variation ratio Δs and the Lab value that has been read as a color value after deformation, is assigned as a CMYK value of the grid point to be processed (step S150). In an instance in which the Lab value and the area variation ratio Δs that have been read are registered in the color compensation conversion LUT 64, a corresponding value is derived from the color compensation conversion LUT 64 and assigned as the CMYK value of the grid point to be processed. In an instance in which the Lab value and the area variation ratio Δs that have been read are not registered in the color compensation conversion LUT 64, a proximate CMYK value is extracted from the color compensation conversion LUT 64 and an interpolation process is performed, and a value thereby obtained is assigned as the CMYK value of the grid point to be processed. When the CMYK value representing the amount of ink has been thus assigned, it is determined whether or not the CMYK value has been assigned to all grid points of the grid 92 (step S160). In an instance in which there are any grid points to which the CMYK value has not been assigned, the flow returns to step S130, each of the grid points is sequentially established as a grid point to be processed, and the process is repeated. In an instance in which the CMYK value representing the amount of ink has been assigned to all grid points, the CMYK value of each of the grid points is saved to the HDD 55 as color compensation data (step S170), and the present routine is ended. Color compensated data thus created can be defined as the color of the target image, and the shape compensated data, in which the shape has been created by the shape compensation process described above, can be defined as the shape of the target image. Data in which the color compensation data and the shape compensation data are combined is outputted as artwork data and used for displaying or printing the image. In summary, in the present embodiment, the Lab value representing the color value for each of the grid points after deformation and the area variation ratio Δs of each of the quadrangles are used to assign, from the color compensation conversion LUT 64, a CMYK value representing the color value for each of the grid points before deformation, and create the color compensation data. It is thereby possible to assign the CMYK value of each of the grid points so as to accurately reflect the effect of change in color accompanying the change in area of each of the elements (quadrangles) in the grid 92 for the medium S, and create the color compensation data so as to accurately reflect the effect of change in color due to deformation of the entire medium S. Also, in the present embodiment, CMYK values representing color values according to the CMYK color system, which is a generic color system, are used, thereby making it possible for the created artwork data to be widely used in image-editing tools and other application software.

Figure 7:
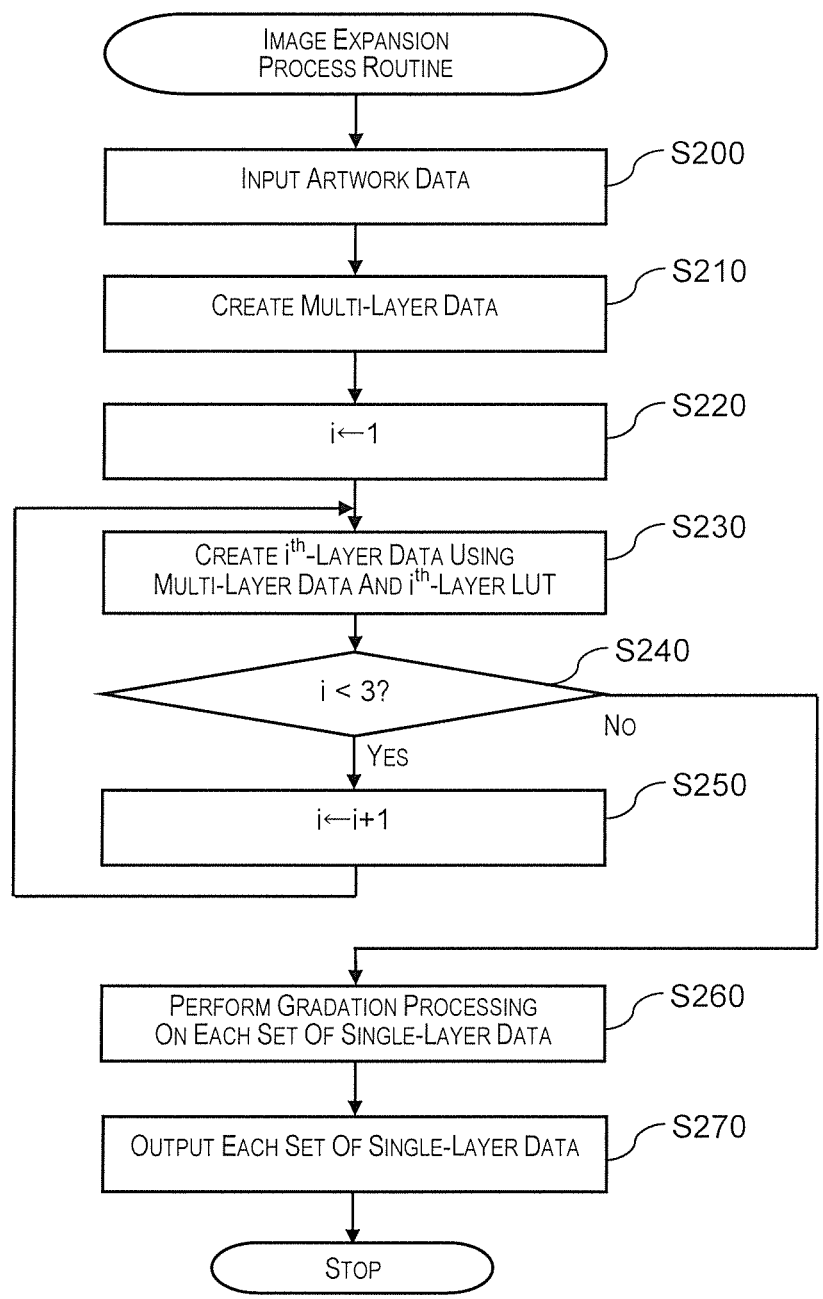
FIG. 7 is a flowchart showing an example of an image expansion process routine.
Figure 8:
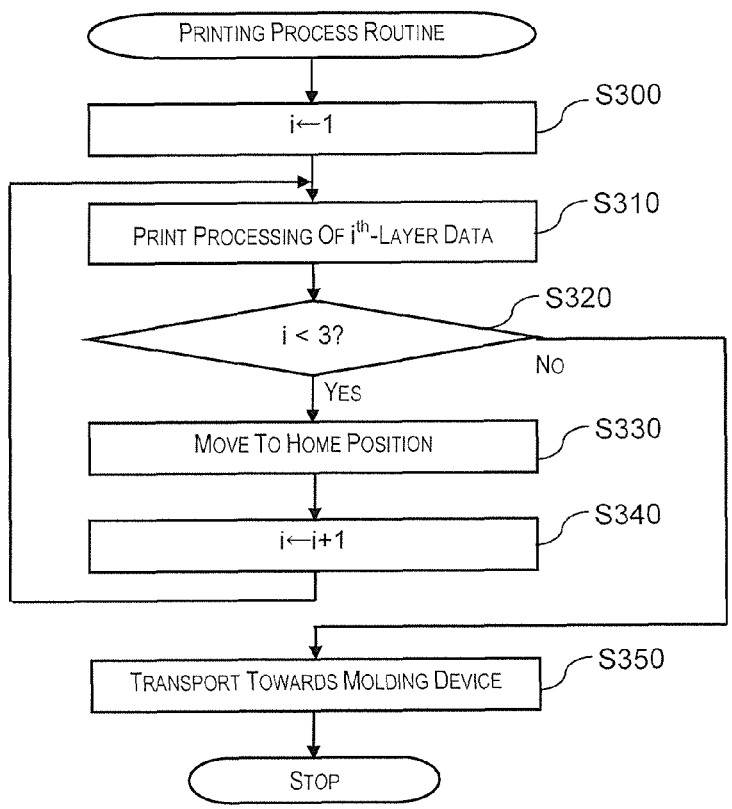
FIG. 8 is a flowchart showing an example of a printing process routine.

Next, a description will be given for a process performed by the decorative molding system 10 according to the present embodiment, and in particular, a process performed when the image represented by the artwork data is printed on the medium S. For the artwork data is used data having a portion at which at least one of the CMYK values representing color values according to the generic colors CMYK exceeds the maximum color value. FIG. 7 is a flowchart showing an example of an image expansion process routine executed by the controller 51 of the PC 50, and FIG. 8 is a flowchart showing an example of a printing process routine executed by the controller 21 of the printer 20. The image expansion process routine shown in FIG. 7 is stored in the HDD 55, and is executed as a process performed by the printer driver 70 when a command to print the image represented by the artwork data has been issued. The printing process routine shown in FIG. 8 is stored in the flash memory device 23, and is executed when the print data is received from the PC 50. The command to print the image represented by the artwork data may, e.g., be inputted by clicking a print command button using the input device 57 in a state in which a print screen (not shown) is displayed on the display 58.

When the image expansion process routine is executed, the CPU 52 of the controller 51 first acquires the artwork data (step S200); converts the acquired artwork data into CMYK values, each representing a color value according to the generic colors CMYK for each unit region (pixel in the present embodiment) used for image processing, and creates multi-layer data (step S210). As with the artwork data, the multi-layer data contains a pixel for which at least one of the CMYK value representing the color value exceeds the maximum color value.

Figure 9:
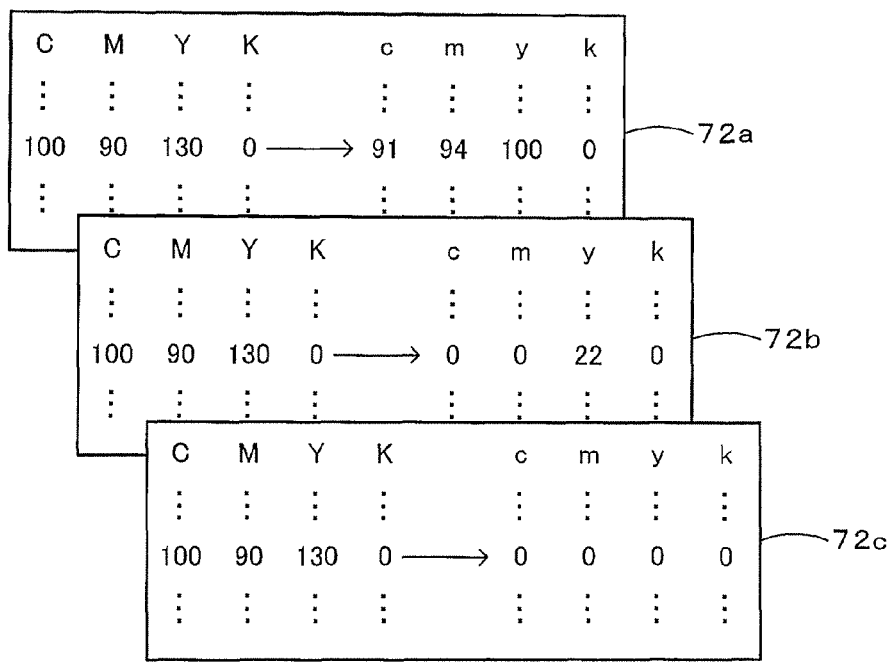
FIG. 9 is a diagram illustrating an example of expansion LUTs 72a through 72c.

Next, a value of 1 is assigned to a variable i (step S220). Using an $i^{th}$-layer LUT, from amongst the (first- through third-layer) expansion LUTs 72a through 72c, and the multi-layer data, the CMYK value representing the color value according to the generic colors CMYK for each of the pixels in the multi-layer data is converted into a cmyk value representing the amount of ink corresponding to ink colors cmyk of the printer 20 for each of the pixels in the $i^{th}$-layer data, whereby single-layer data ($i^{th}$-layer data) is created (step S230). The variable i is compared to a value of 3 (the number of expansion LUTs 72a through 72c) (step S240). If the variable i is less than a value of 3, the variable i is incremented (step S250), and the flow returns to step S220. Thus, $i^{th}$-layer data is created from the multi-layer data until it is determined in step S240 that the variable i is equal to a value of 3. The single-layer data ($i^{th}$-layer data) is data for which all of the cmyk values for all of the pixels are less than or equal to a maximum ink amount, which represents the maximum value in a normal printing range, i.e., data which is less than or equal to 100% where 100% represents the maximum ink amount. Each of the expansion LUTs 72a through 72c is a correspondence relationship table defining the relationship between the CMYK value, which represents the color value according to the generic colors CMYK, and the cmyk value, which represents the amount of ink corresponding to ink colors cmyk of the printer 20. FIG. 9 is a diagram illustrating an example of the (first- through third-layer) expansion LUTs 72a through 72c. In FIG. 9, only a part of each of the expansion LUTs 72a through 72c is shown. Each of the expansion LUTs 72a through 72c is configured as a table in which each of the CMYK values is varied by a predetermined value (e.g., 10). Also, in the present embodiment, in the expansion LUTs 72a through 72c, the cmyk values representing the amount of ink according to each of the first- through third-layer data are defined so as to be less than or equal to the maximum value in a normal printing range (maximum ink amount) and so that the integrated value of the cmyk values representing the amount of ink according to each of the first- through third-layer data is equal to a cmyk value corresponding to the CMYK value (i.e., a value obtained by replacing the CMYK value directly without decomposing the pixel value). A detailed description will now be given for a process for expanding the multi-layer data in which the expansion LUTs 72a through 72c are used.

Figure 10:
FIG. 10 is a diagram illustrating an example of circumstances in which a color value in the multi-layer data is converted into the amount of ink in single-layer data.
Figure 10:
Figure 10:
Figure 10:
Figure 11:
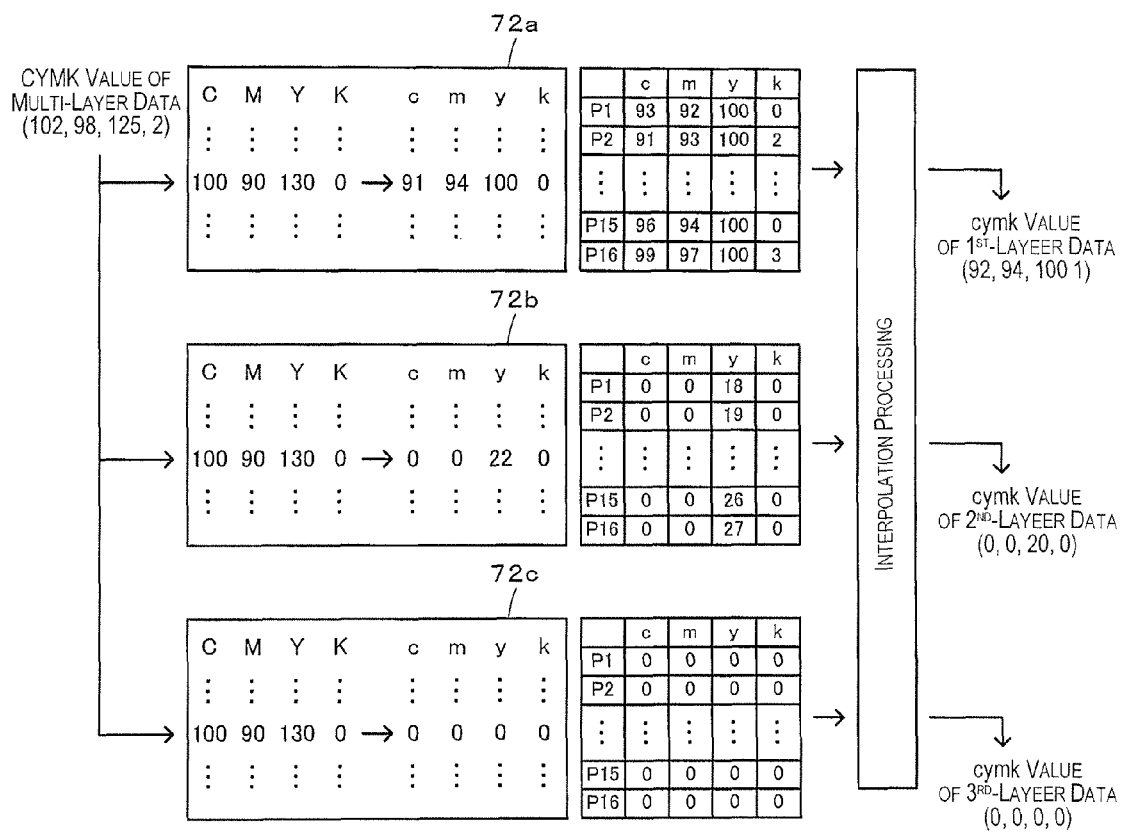
FIG. 11 is a diagram illustrating an example of circumstances in which a color value in the multi-layer data is converted into amounts of ink in the single-layer data.

First, a description will be given for a process for creating first-layer data from the multi-layer data using the first-layer LUT 72a. FIG. 10 is a diagram illustrating an example of circumstances in which a CMYK value representing a color value in the multi-layer data is converted into a cmyk value representing the amount of ink in the first-layer data. The example shown in FIG. 10 shows an instance in which the CMYK value of a given pixel in the multi-layer data is 102, 98, 125, 2. In this instance, since there are four parameters, namely a C-value, an M-value, a Y-value, and a K-value, a CMYK value is assigned to each of $2^4$, i.e., sixteen grid points P1 through P16 resulting from a combination of two values on either side of each of the parameters (i.e., 100 and 110 for the C-value, 90 and 100 for the M-value, 120 and 130 for the Y-value, and 0 and 10 for the K-value). Using the first-layer LUT 72a, an output cmyk value corresponding to the input CMYK value of each of the sixteen grid points P1 through P16 is derived. A known interpolation process is performed on the derived cmyk values for the sixteen grid points, thereby obtaining a cmyk value of 92, 94, 100, 1 in the first-layer data corresponding to the CMYK value of 102, 98, 125, 2 in the multi-layer data. Performing a process of such description on each of the pixels in the multi-layer data makes it possible to use the first-layer LUT 72a to expand the multi-layer data into the first-layer data. Similarly, the second- and the third-layer LUTs 72b, 72c can be used to create second-layer data and third-layer data from the multi-layer data. Looking at a given pixel in the multi-layer data, in an instance in which the CMYK value for the pixel is 102, 98, 125, 2, the first-layer LUT 72a is used to obtain a cmyk value of 92, 94, 100, 1 in the first-layer data, the second-layer LUT 72b is used to obtain a cmyk value of 0, 0, 20, 0 in the second-layer data, and the third-layer LUT 72c is used to obtain a cmyk value of 0,0,0,0 in the third-layer data, as shown in FIG. 11. Thus, the multi-layer data can be expanded into three sets of single-layer data. Since the expansion LUTs 72a through 72c are used to convert the CMYK value representing the color value of each of the pixels in the multi-layer data into the cmyk value representing the amount of ink in each of the pixels in the first- through third-layer data, conversion from CMYK values to cmyk values and the expansion from multi-layer data into three sets of single-layer data can be performed simultaneously, making it possible to reduce the number of processes and increase processing speed. Also, because the multi-layer data is such that the image is expressed using a generic CMYK color system, editing of the multi-layer data and displaying of the image can be made more versatile. Furthermore, because the $i^{th}$-layer LUT corresponding to the $i^{th}$-layer data, from amongst the three (first-through third-layer) expansion LUTs 72a through 72c, is used to create the $i^{th}$-layer data from the multi-layer data, it is possible to expand the multi-layer data in a similar manner to an instance such as that in which color conversion is performed on image data using a look-up table corresponding to the type of medium S (e.g., normal paper, cardboard, photographic paper, etc.) during normal printings.

When it is determined in step S240 that the variable i is equal to a value of 3 (the number of expansion LUTs 72a through 72c), each of the first- through third-layer data is subjected to tone reproduction processing, e.g., halftone processing or pulse-width modulation processing, and outputted to the printer 20 as print data (step S270); and the present routine is ended.

Next, a description will be given for the printing process. When the printing process routine shown in FIG. 8 is executed, the CPU 22 of the controller 21 of the printer 20 first assigns a value of 1 to a variable i representing the number corresponding to the next single-layer data to be printed (step S300), and controls the printing mechanism 25 and the transport mechanism 32 so that a printing process is performed using the $i^{th}$-layer data, i.e., so that the image represented by the $i^{th}$-layer data is printed on the medium S (step S310).

When the image represented by the $i^{th}$-layer data is thus printed on the medium S, the variable i is compared to a value of 3 (the number of sets of single-layer data) (step S320). If the variable i is less than the value of 3, the printing mechanism 25 and the transport mechanism 32 are controlled so that the printing head 28 of the printing mechanism 25 and the medium S return to a home position (i.e., position before execution of the printing process has started) (step S330), the variable i is incremented (step S340), and the flow is returned to step S310. Thus, the processes of steps S310 through S340 are repeatedly executed, whereby multi-layer printing, in which images respectively represented by the first- through third-layer data are sequentially printed in an overlapping manner, is performed. If, in step S320, it is determined that the variable i is equal to the value of 3 (the number of sets of single-layer data), it is decided that the printing process is complete for all layers (i.e., that image formation is complete), the transport mechanism 32 is controlled so that the medium S is transported towards the molding device 40, and the present routine is ended. Thus performing multi-layer printing using three sets of single-layer data makes it possible to print an image represented by the multi-layer data onto the medium S. Performing multi-layer printing using three sets of single-layer data created by expanding the multi-layer data makes it possible to print the image on the medium S in a similar manner to normal (single-layer) printing other than the need to return the medium S to the home position. Therefore, there is no need to use a dedicated multi-layer printer for the printer 20, and versatility is increased. Alternatively, the printing process may be omitted for single-layer data in which the entire cmyk value representing the amount of ink corresponding to ink colors cmyk has a value of zero for all pixels (i.e., data for which an image to be printed does not exist). For example, in an instance in which the entire cmyk value has a value of zero for all pixels in the third-layer data, the medium S may be transported towards the molding device 40 without returning the medium S to the home position after printing has been performed for the second-layer data.

Correspondence relationships between constituent sets of the present embodiment and the constituent sets of the present invention will now be explained. The controller 51 for executing the process of step S210 of the image expansion process routine shown in FIG. 7 of the present embodiment corresponds to the acquiring part of the present invention, and the controller 51 for executing the processes of steps S220 through S250 of the image expansion process routine shown in FIG. 7 corresponds to the expanding part. The controller 21 for executing the printing process routine shown in FIG. 8 corresponds to the image-forming part. In the present embodiment, the description of the operation of the image processing device also gives an explanation of an example of an image processing method according to the present invention.

According to the printer 20 of the decorative molding system 10 according to the present embodiment described above, three expansion LUTs 72a through 72c are used to expand the multi-layer data into three sets of single-layer data (first-through third-layer data); therefore, printing the images respectively represented by the three expanded sets of single-layer data in an overlapping manner makes it possible to print the image represented by the multi-layer data onto the medium S. Also, the three sets of single-layer data is created from the multi-layer data using three expansion LUTs 72a through 72c defining a correspondence relationship between CMYK values, which represent color values according to the generic colors CMYK in the multi-layer data, and cmyk values, which represent the amount of ink corresponding to ink colors cmyk of the printer 20 for each of the plurality of sets of single-layer data, it is possible to reduce the number of processes and increase processing speed compared to an instance in which conversion of the CMYK values into the cmyk values of the printer 20 and expansion of the multi-layer data into three sets of single-layer data are performed separately.

It shall be apparent that the present invention is not limited in scope by the embodiment described above, and may be carried out in a variety of modes without departing from the technical scope of the present invention.

In the embodiment described above, the three sets of single-layer data are created from the multi-layer data using three expansion LUTs 72a through 72c; however, the number of the expansion LUTs 72a through 72c and the number of sets of single-layer data are not limited to three, and may be a number that corresponds to the range of CMYK values representing the color values in the multi-layer data to be printed.

In the embodiment described above, the multi-layer data is such that an image is expressed by a CMYK value representing a color value according to the generic colors CMYK for every unit region (pixel). However, the multi-layer data may be such that an image is expressed using color values (e.g., pixel values) according to the RGB color system, the L*a*b* color system, or another color system; or such that an image is expressed by the amount of ink corresponding to each ink color (cmyk in the embodiment described above) of the printer 20. The single-layer data is such that an image is expressed by the amount of ink corresponding to each ink color of the printer 20. However, the single-layer data may be such that an image is expressed by cmyk values representing the amount of ink having generic ink colors cmyk, or such that an image is expressed by color values according to the CMYK color system, the RGB color system, the L*a*b* color system, or another color system. In an instance such as those described above, the expansion LUTs 72a through 72c may show a relationship corresponding to the multi-layer data and the plurality of sets of single-layer data, e.g., in an instance in which both the multi-layer data and the single-layer data are represented by cmyk values representing the amount of ink having generic ink colors cmyk, a relationship between the cmyk values in the multi-layer data and the cmyk values in each of the sets of single-layer data. In an instance such as the present example in which the multi-layer data is such that an image is expressed by CMYK values representing color values according to the generic colors CMYK, and the single-layer data is such that an image is expressed by cmyk values representing the amount of ink corresponding to ink colors cmyk of the printer 20, conversion of CMYK values to cmyk values and expansion from multi-layer data to a plurality of sets of single-layer data can be performed simultaneously.

In the embodiment described above, artwork data in which a CMYK value representing a color value according to the generic colors CMYK is assigned to each of the grid points of the grid 92 undergoes conversion to CMYK values assigned to every unit region (pixel) for image processing, and the multi-layer data is created. However, the artwork data may be used directly as multi-layer data and expanded into a plurality of sets of single-layer data. In such an instance, the unit region is a region corresponding to each of the grid points of the grid 92, and each of the plurality of sets of single-layer data is one in which cmyk values representing the amount of ink are assigned to positions corresponding to the grid points of the grid 92.

The embodiment described above is one in which the medium S is subjected to deformation after multi-layer printing, in which a plurality of images represented by single-layer data are printed in an overlapping manner onto the medium S, is performed, whereby the image represented by the multi-layer data is printed onto the medium S. Specifically, the embodiment involves processing an image to be formed, before deformation, on the medium S, which is subjected to deformation after the image is formed. Alternatively, however, the medium S is not subjected to deformation after a plurality of images represented by single-layer data are printed in an overlapping manner onto the medium S, whereby the image represented by the multi-layer data is printed onto the medium S; i.e., processing is performed on an image formed on a medium S that is not subjected to deformation.

In the embodiment described above, area variation ratio Δs representing the ratio between pre- and post-deformation areas of a quadrangle formed by the grid 92, is used as a measure of degree of deformation of the medium S. However, area variation ratio representing the ratio between pre- and post-deformation areas of a triangle formed by three adjacent grid points, from amongst the grid points formed by the grid 92; area variation ratio representing the ratio between pre- and post-deformation areas of a shape obtained by further dividing a quadrangle formed by the grid 92; or a linear change ratio, representing the ratio between pre- and post-deformation distances between the grid points formed by the grid 92; may also be used.

In the embodiment described above there is established, as a CMYK value of the grid point to be processed, a CMYK value representing the value of the generic colors CMYK obtained from the color compensation conversion LUT 64 using the area variation ratio Δs of a quadrangle representing a degree of change of a quadrangle corresponding to each grid point. However, deformation of the medium S may, alternatively, not be taken into account with regards to forming the image.

In the embodiment described above, the printer 20 has four ink colors cmyk; however, this is not provided by way of limitation. For example, the printer 20 may have six colors comprising orange and purple in addition to the four colors cmyk; six colors comprising light cyan and light magenta in addition to the four colors cmyk; or six or more colors.

In the embodiment described above, ink is used as a forming agent for forming the image. However, this is not provided by way of limitation as long as the agent is capable of forming an image on the medium S. For example, a liquid other than ink, a liquid body in which functional material particles are dispersed (i.e., a dispersion), a gel or another fluid body, a toner or another powder, and other agents may also be used.

In the embodiment described above, the printer 20 is provided with an inkjet-type printing mechanism 25 for ejecting ink; however, this is not provided by way of limitation. A laser printer, a thermal transfer printer, or a dot impact printer may also be used. Also, although an image processing device such as a PC 50 has been adopted in the embodiment, modes relating to an image processing method or a program capable of executing the image processing method are also possible.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image processing device for creating image data used to form an image on a medium, the image processing device comprising:
   a multi-layer data acquiring part configured to acquire multi-layer data having a required-formation-amount-related value representing a value relating to a formation amount required to form an image in at least one unit region;
   an expanding part configured to expand, based on a correspondence relationship for expansion, the acquired multi-layer data into a plurality of sets of single-layer data; and
   a storing part configured to store the correspondence relationship for expansion,
   the correspondence relationship for expansion having a correspondence relationship between the required-formation-amount-related value in each of the sets of single-layer data and the required-formation-amount-related value in the multi-layer data,
   the required-formation-amount-related value in the multi-layer data being image data that exceeds a maximum-formation-amount-related value representing a value relating to a maximum formation amount of a color value of the single-layer data with which an image can be printed in the at least one unit region in a single printing process, and
   the required-formation-amount-related value in the single-layer data being image data that is equal to or less than the maximum-formation-amount-related value.

2. The image processing device according to claim 1, wherein
   the correspondence relationship for expansion is a correspondence relationship between a pixel value in the multi-layer data and an amount of a forming agent having a generic color or a color used to form an image in relation to each of the sets of single-layer data.

3. The image processing device according to claim 1, wherein
   the multi-layer data acquiring part is configured to acquire the multi-layer data in which an image is expressed using a color combination according to a generic color system.

4. The image processing device according to claim 1, wherein
   the image processing device is configured to create the image data for a molded article formed by forming an image on the medium based on the image data and then causing the medium to deform.

5. The image processing device according to claim 4, further comprising
   a color-correspondence-relationship-storing part configured to store a color correspondence relationship, which is a correspondence relationship between a degree of deformation of the medium, a color before deformation, and a color after deformation reflecting a color change accompanying deformation,
   a deformation-degree-acquiring part configured to acquire the degree of deformation in each portion of the medium, and
   a color-determining part configured to determine a color of an image to be formed on each portion of the medium in relation to a color of an image of the molded article based on the acquired degree of deformation and the stored color correspondence relationship,
   the multi-layer data being data in which the color of the image to be formed on each portion of the medium has been determined by the color-determining part.

6. An image processing system comprising:
   the image processing device according to claim 1; and
   an image-forming device configured to form an image on the medium using a forming agent for forming an image, the image-forming device including an image-forming part configured to form images so that images represented by each of the sets of single-layer data overlap in a predetermined sequence, a number of times the images being formed corresponding to a number of sets of single-layer data.

7. An image processing method for creating image data used to form an image on a medium, the image processing method comprising:
- acquiring multi-layer data, which is image data in which a required-formation-amount-related value representing a value relating to a formation amount required to form an image in at least one unit region exceeds a maximum-formation-amount-related value representing a value relating to a maximum formation amount of a color value of the single-layer data with which an image can be printed in the at least one unit region in a single printing process; and
- expanding, into a plurality of sets of single-layer data, the acquired multi-layer data based on the acquired multi-layer data and a correspondence relationship for expansion,
- the correspondence relationship for expansion being a correspondence relationship between the required-formation-amount-related value in the multi-layer data and the required-formation-amount-related value in each of the sets of single-layer data, and
- the required-formation-amount-related value of each of the plurality of sets of single-layer data being equal to or less than the maximum-formation-amount-related value.

8. The image processing device according to claim 7, wherein
- the correspondence relationship for expansion being a correspondence relationship between a pixel value in the multi-layer data and an amount of a forming agent having a generic color or a color used to form an image in relation to each of the sets of single-layer data.

9. The image processing method according to claim 7, wherein
- the acquiring of the multi-layer data includes acquiring the multi-layer data in which an image is expressed by a color combination according to a generic color system.

10. The image processing method according to claim 7, wherein
- the image processing method creates the image data for a molded article formed by forming an image on the medium based on the image data and then causing the medium to deform.

11. The image processing method according to claim 10, further comprising
- storing a color correspondence relationship, which is a correspondence relationship between the degree of deformation of the medium, a color before deformation, and a color after deformation reflecting a color change accompanying deformation,
- acquiring the degree of deformation in each portion of the medium, and
- determining a color of an image to be formed on each portion of the medium in relation to a color of an image of the molded article based on the acquired degree of deformation and the stored color correspondence relationship,
- the multi-layer data being data in which the color of the image to be formed on each portion of the medium has been determined in the color-determining step.

12. A non-transitory computer usable medium storing a computer program for causing one or more computers to execute steps of the image processing method according to claim 7.

13. An image processing system comprising
- a personal computer provided with a memory unit including the non-transitory computer usable medium according to claim 12; and
- a printer configured to print the image based on printing data outputted from the personal computer.

* * * * *